US00RE35304E

United States Patent [19]

Biagiotti

[11] E Patent Number: Re. 35,304

[45] Reissued Date of Patent: Jul. 30, 1996

[54] APPARATUS FOR APPLYING ADHESIVE ON TUBULAR CORES FOR ROLLS OF WEB MATERIAL AND FOR FEEDING SAME CORES TO A WEB WINDING MACHINE

[75] Inventor: Guglielmo Biagiotti, Via Di Vorno, Italy

[73] Assignee: Fabio Perini S.p.A., Lucca, Italy

[21] Appl. No.: 174,817

[22] Filed: Dec. 29, 1993

Related U.S. Patent Documents

Reissue of:

[64] Patent No.: 4,931,130
Issued: Jun. 5, 1990
Appl. No.: 236,487
Filed: Aug. 25, 1988

[30] Foreign Application Priority Data

Sep. 1, 1987 [IT] Italy ..... 9473 A/87

[51] Int. Cl.[6] ..... B65H 19/20

[52] U.S. Cl. ..... 156/446; 156/184; 156/508; 242/533; 242/542; 493/303

[58] Field of Search ..... 156/184, 185, 156/190–192, 195, 212, 215, 218, 172, 187, 188, 425, 428, 429, 443, 446–458, 468, 291; 242/56 R, 56 A, 67.1 R, 533, 533.1, 542; 493/303, 305, 306, 273, 274, 278

[56] References Cited

U.S. PATENT DOCUMENTS

| | | | |
|---|---|---|---|
| 2,812,007 | 11/1957 | Touchett et al. | 493/273 X |
| 3,044,532 | 7/1962 | Ghisoni | 156/361 |
| 3,134,706 | 5/1964 | Alexander | 156/357 |
| 3,505,150 | 4/1970 | Andersson | 156/466 |
| 3,908,923 | 9/1975 | Salgo | 242/56 R |
| 4,157,794 | 6/1979 | Brandauer et al. | 242/66 |
| 4,338,147 | 7/1982 | Backstrom et al. | 156/187 |
| 4,456,190 | 6/1984 | Karttunen et al. | 242/56 R |
| 4,484,968 | 11/1984 | Quist et al. | 493/306 X |
| 4,723,724 | 2/1988 | Bradley | 242/56 R |

FOREIGN PATENT DOCUMENTS

| | | |
|---|---|---|
| 586234 | 10/1933 | Germany . |
| 2224502 | 12/1973 | Germany . |
| 3317370 | 12/1984 | Germany . |
| 54-4806 | 1/1979 | Japan . |
| 1324183 | 7/1973 | United Kingdom . |

OTHER PUBLICATIONS

Greiner, Tappi Press, vol. 64, No. 10, Oct. 1981—"The Automation of Roll Set Changes on Fast Winders".

Jagenberg Technical Information (T.I.) Brochure on Vari–Step Double Support Roller (with translation).

Vari–Dur Product Brochure on Jagenberg Rolling Machine (with translation).

*Primary Examiner*—James J. Engel
*Attorney, Agent, or Firm*—Breiner & Breiner

[57] ABSTRACT

A machine is disclosed for applying adhesive to the small, tubular cores on which paper webs are wound for the manufacture of toilet paper, kitchen towels and the like. The machine also moves the cores from the hopper, and after adhesive is applied, in an axial direction to the paper re-winder.

6 Claims, 4 Drawing Sheets

APPARATUS FOR APPLYING ADHESIVE ON TUBULAR CORES FOR ROLLS OF WEB MATERIAL AND FOR FEEDING SAME CORES TO A WEB WINDING MACHINE

Matter enclosed in heavy brackets [ ] appears in the original patent but forms no part of this reissue specification; matter printed in italics indicates the additions made by reissue.

*This application is a Reissue of Ser. No. 236,487, U.S. Pat. No. 4,931,130.*

BACKGROUND OF THE INVENTION

The invention refers to paper converting machines and in particular, to rewinding or re-reeling machines. They may be from off-machine paper reels or by reels directly coming from the paper mill. They unwind the paper at high speed and wind it on small tubular cores to form logs or rolls of paper web of relatively small diameter, such as toilet tissue or kitchen towels. The logs are much longer than the standard toilet tissue roll (approximately 4½") or the standard kitchen towel (approximately 9") and are then cut transverse to the axis of the core or log to the rolls of paper utilizable in domestic or industrial facilities.

Converting machines of the type considered herein are disclosed in prior art patents such as U.S. Pat. No. 4,327,877 and Italian Patent 963047 and French Patent 2,193,387.

OBJECTS OF THE INVENTION

A problem with such type of rewinding machines is the feeding of the tubular cores to the machine and the application of adhesive or glue on the cores for holding the leading edge of the paper web to be wound on the core for the formation of the roll. The apparatus according to the present invention relates to a system which provides for the fast presentation and feeding of a tubular core (which has adhesive distributed thereon in a relatively limited amount although sufficient for the paper retention) and for stabilizing the initial turn of the length of paper web to be wound. The apparatus provides a speedy operation which does not slow down the productivity of the rewinder.

This and other objects and advantages of the invention will be evident to those skilled in the art from the reading of the following text.

SUMMARY OF THE INVENTION

In a paper-converting plant, the lightweight, small diameter cores on which the paper is to be wound generally are manufactured at one part of the factory and are then fed axially along a conveyor line to a receiving hopper where a plurality of the long cores are stored until they are needed on the rewinding machine. At that time, one of the cores is moved into alignment with the winding portion of the rewinder machine, and the adhesive is applied to the core for receiving and holding the leading edge of the paper web to be wound on the core.

It is preferred that the adhesive is distributed along the surface of the core while the core is moving axially into position to receive the leading edge of the web of the paper.

In order to support the core along its axial movement, two spaced-apart supports are provided, between which the adhesive applicating mechanism operates.

Because the core advancing mechanism is outside and to one side of the rewinder, at least one of the supports may consist of a continuous belt for the advancement and the launch. In the adhesive application zone, another continuous belt may be provided.

The adhesive application means may be a rotating disc which dips into an adhesive-storing container and then wipes against the approaching core. The peripheral speed of the disc is preferably slightly less than that of the advancing core.

With the above and other objects in view, further information and a better understanding of the present invention may be achieved by referring to the following detailed description.

DETAILED DESCRIPTION

For the purpose of illustrating the invention, there is shown in the accompanying drawings a form thereof which is at present preferred, although it is to be understood that the various instrumentalities of which the invention consists can be variously arranged and organized, and that the invention is not limited to the precise arrangement and organizations of the instrumentalities as hereto shown and described.

In the drawings, wherein like reference characters indicate like parts:

Figure 1:
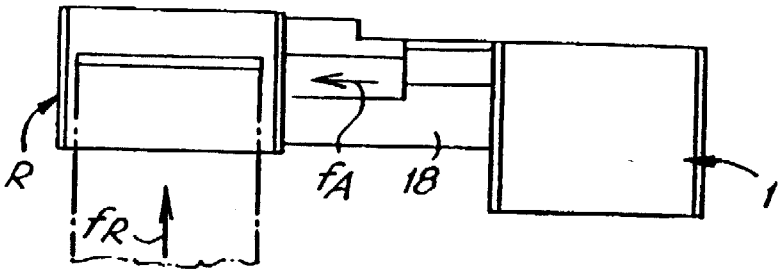
FIG. 1 shows a schematic top plan view of the winder and core-feeder.
Figure 2:
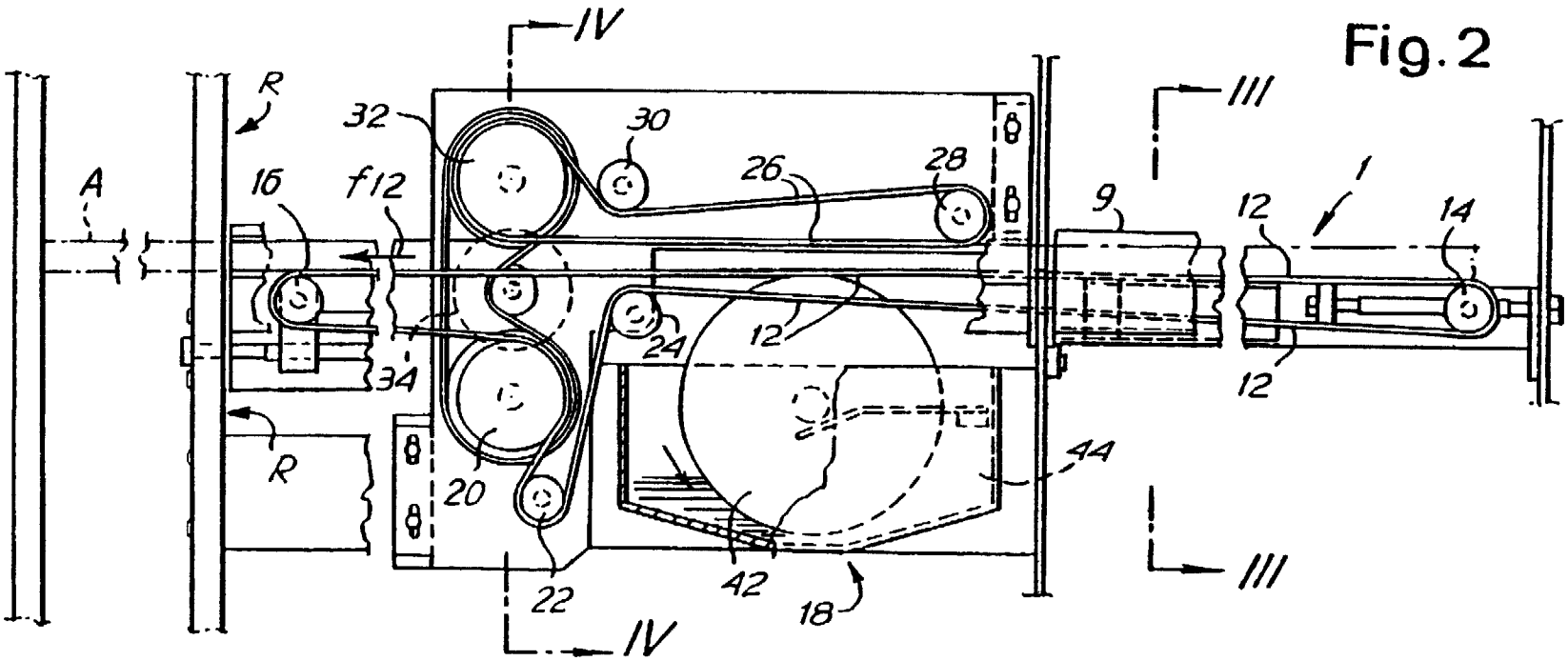
FIG. 2 is a vertical section, parallel to the trajectory of a core for the side feeding to a winder.
Figure 3:
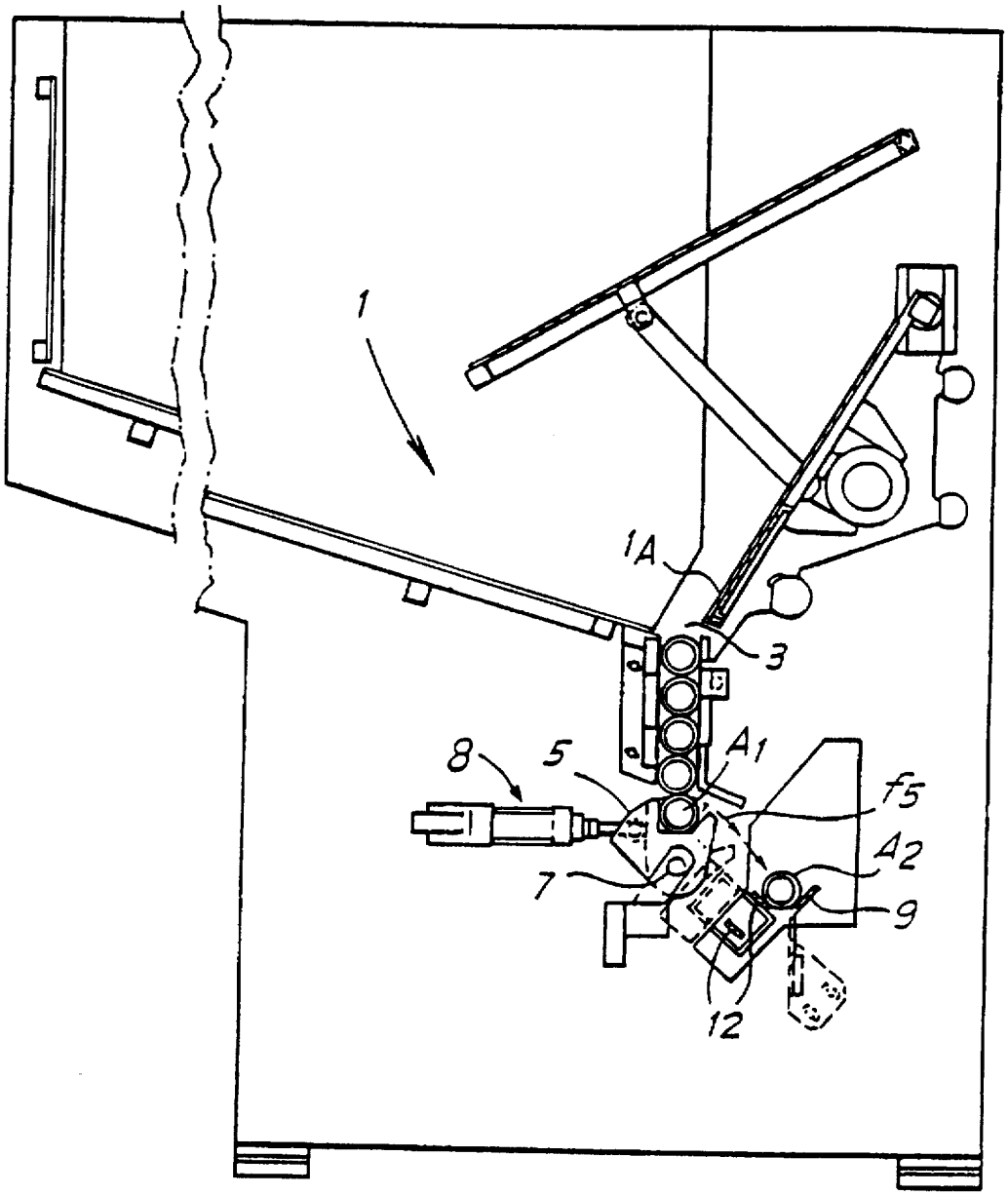
FIG. 3 is a section on line III—III of FIG. 2.

According to what is illustrated in FIGS. 1, 2 and 3, numeral 1 generally indicates a hopper or reservoir intended to feed cores to a vertical lower channel 3, wherein the cores coming from reservoir 1 are stacked on top of each other. The hopper-reservoir 1 is provided with a suitable agitator 1A to ensure the regular movement of the tubular cores, made of cardboard of the like, into channel 3. The vertical channel 3 ensures the feeding of cores to a distributor device which feeds, in succession, one core after the other to a transfer line for transferring cores to the rewinder. This hopper 1 is placed at one side of the rewinder (indicated by R in FIGS. 1, 2 and 6) at a limited distance and sideway with respect to the direction of the unwinding of the paper web and of the removal of logs or rolls of paper formed by rewinder R. The movement of the paper web is indicated by arrow fR in FIG. 1. Cores are fed to the rewinder in a direction fA at a right angle to direction fR of paper unwinding and rolls or logs removal, and thus in the axial direction of said tubular core. The core reaches the rewinder with the adhesive applied thereon.

At the lower end of channel 3, a distributor is provided consisting of a member 5 oscillating about an axis 7. Member 5 is driven by a cylinder-piston system 8 to rotate about the axis 7 in the direction of arrow f% from the position (shown in FIG. 3 where it has received core A1 from channel 3. It moves the core in the direction of arrow f5 to a position of release (A2) from which it is moved axially to the rewinder R according to the direction of arrow fA.

At the core position A2, an inclined wall 9 provides support (theoretically on a single generatrix) for the right lower quadrant of the core as can be seen by looking at the drawing of the core section at A2. A second support for the left lower quadrant of the core (when looking at the core A2 in FIG. 3) is provided by the upper portion of a transferring belt 12. The motion of member 5 is a reciprocating motion for the successive feeding of cores from position A1 to position A2. During the movement of member 5, a suitably arcuated profile having its center on axis 7 keeps the column of cores within channel 3. The distribution 5 preferably is made up of two or more elements, one to ensure the smooth transfer of the core, and the other to ensure the positive support of the core column within channel 3.

The inclined wall 9 extends the entire length of the apparatus up to the rewinder R. The transfer belt 12 is driven between a transmission pulley 14, which may be adjustable for tensioning, and an adjustable return pulley 16. Pulley 16 is located close to the structure of rewinder R, and the axial displacement of the core by the upper section of belt 12 (in the direction of arrow f12) advances the core to the rewinder, being launched by belt 12.

As the core is transferred to the rewinder, it is pushed from the hopper reservoir 1, past the glue applicator 18 (which is between the rewinder and the core reservoir-hopper 1). Belt 12 is further driven around a motive pulley 20 and around transmission pulleys 22 and 24. Moreover, the active upper portion of belt 12, slides over a supporting surface. In particular, one supporting surface may extend along the adhesive application group 18 in order to overcome the effect of belt 26 which is disposed with its own active lower portion in a position opposite to the active upper portion of belt 12. This ensures the core advancement in the direction of arrow f12. Belt 26 is driven between pulleys 28, 30 and 32, the latter of which may be motive and driven by the same motor 34 which drives also the pulley 20. The movements of the transfer belt 12 and of the opposing belt 26 are intermittent and suitably synchronized with the operating cycle of rewinder R, which must receive a core, having adhesive thereon, before the start of every cycle for the formation of a log or roll in the rewinder, as is well known in the art.

Figure 4:
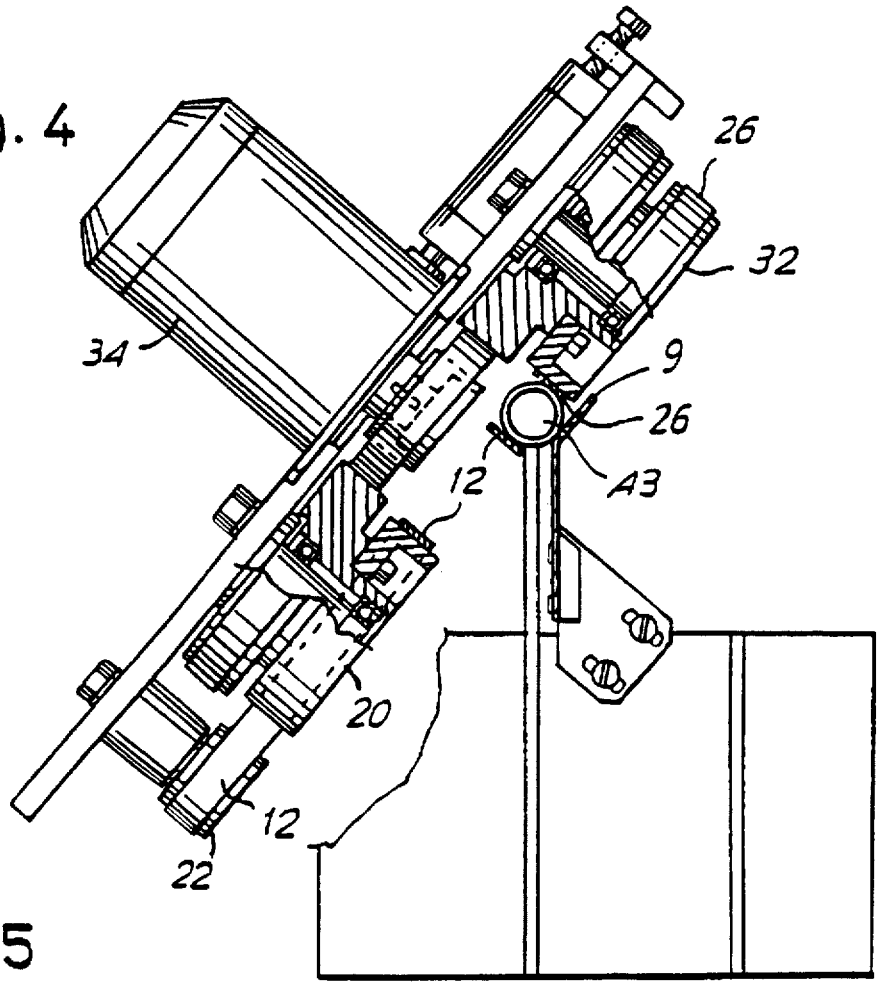
FIG. 4 is a section on line IV—IV of FIG. 2.

The core at position A2 (FIG. 3), resting on belt 12 and on inclined wall 9, is made to advance by movement of said belt 12 and to pass it through the adhesive-dispensing group 18 wherein the opposing belt 26 is also located, which belt 26 ensures the axial push on the core passing therein at the position indicated by A3 (see FIG. 4). Upon the transit through the adhesive applicator 18, the core, positioned at A3, is supported all the time by the reclined wall 9 and the belt 12 spaced apart to a limited extent in order to leave a space less than the cross-section of the core where the application of adhesive takes place.

For the application of the adhesive, a disc 42 is provided which is able to rotate by a continuous motion with a peripheral speed which may be less than the core advancement speed at the position A3. In any case, the relative speeds give rise to a mutual rubbing of the disc periphery and the core lower zone, so as to allow the disc to effectively apply the adhesive to the core in a uniform way and in relatively limited amounts. Disc 42 is arranged to dip into an adhesive container 44 which can be suitably stirred and kept at a desired level to make sure that disc 42 picks up a predetermined amount of adhesive at every revolution. Scraper means may also be provided to ensure the distribution of a constant amount of adhesive. Clearly, with such an arrangement, the adhesive is applied because of the movement of the core by belt 12 along a lower longitudinal portion, with respect to the location of the core between support 9 and the upper active position of belt 12.

The core that has received the adhesive reaches the rewinder R and is directly inserted in axial direction (see arrow f12) with a continuation of the movement allowing same core to be timely positioned and thus in condition to be inserted between the cylinders of the winding system of the rewinder.

Figure 7:
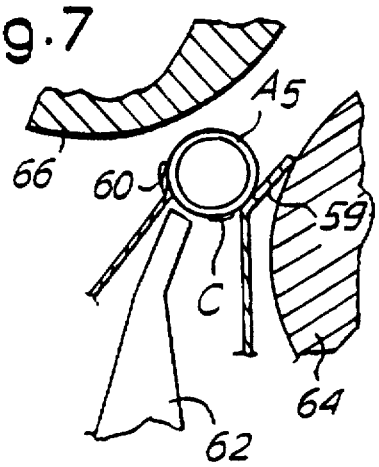
FIG. 7 is an enlarged detail of FIG. 5.
Figure 6:
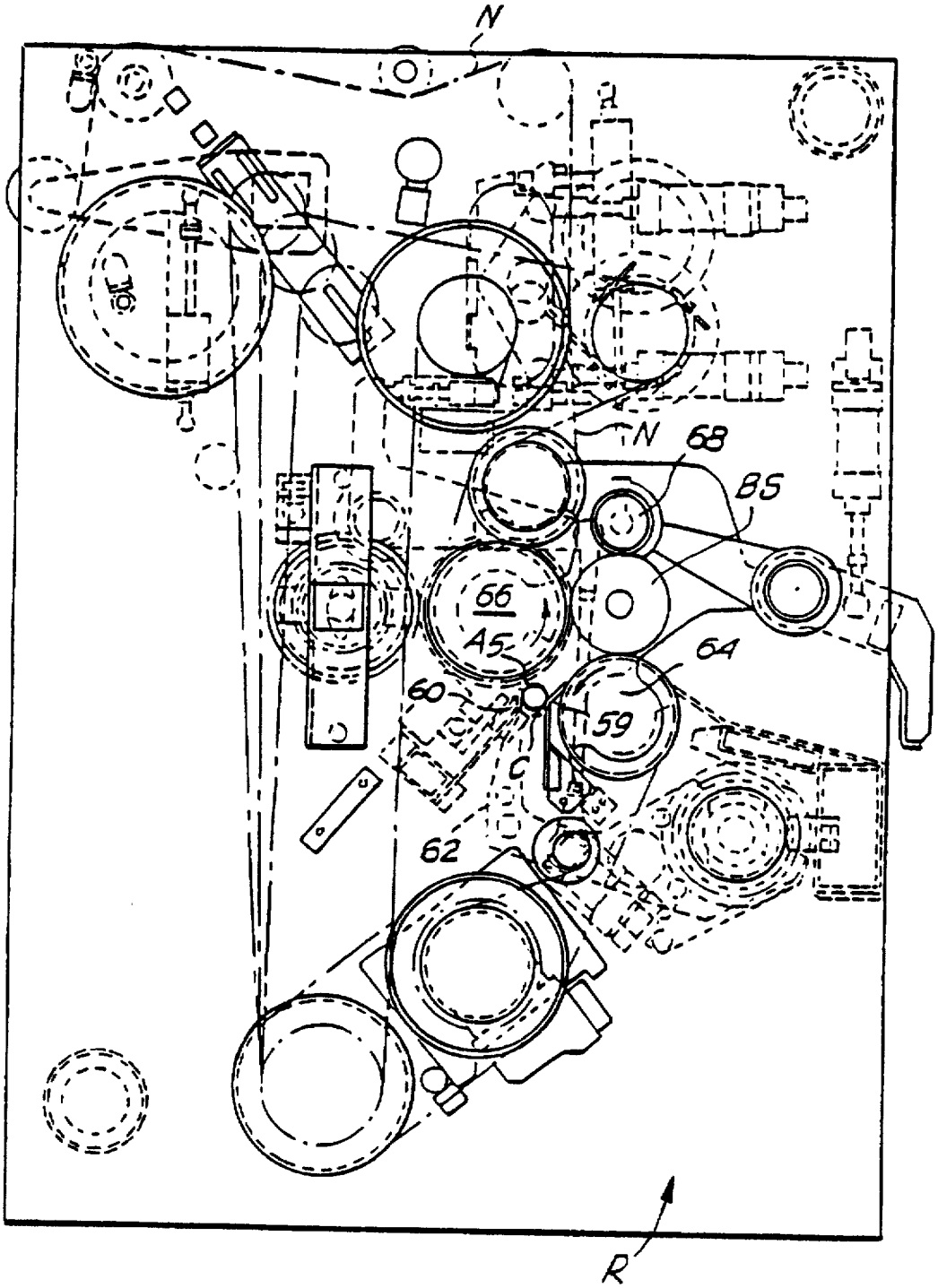
FIG. 6 is a sectional side view of a rewinder.

FIGS. 6 and 7 show schematically a feasible embodiment of the system for the winding of the paper web intended to form a log roll on the core. As these rewinders are of various and known type, only the main elements will be herein described.

Figure 5:
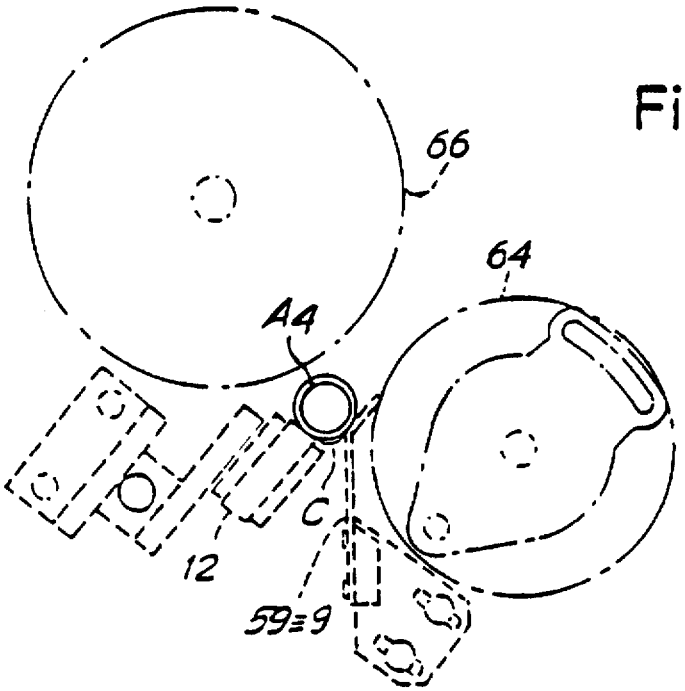
FIG. 5 is a fragmentary view along arrow V of FIG. 2.

As can be seen in said Figures, the core reaches, from the dwell position A4 (FIG. 5) immediately at the side of rewinder R, the position A5 (FIG. 7) inside the rewinder where it is axially pushed along a guidewall 59, which is the continuous extension of wall 9. Wall 9 starts from below the hopper of reservoir 1, and past a wall 60 which faces wall 59 and is spaced therefrom a distance substantially equivalent to that of the upper branch of belt 12. Walls 59 and 60 may be the continuation of wall 9 and of the upper branch of belt 12, thereby the core, from the stand-by position immediately adjacent the rewinder R, is axially pushed into the seat located inside the rewinder and defined by walls 59 and 60. The spacing between walls 59 and 60 corresponds to the zone of core 5 where the latter is supplied with adhesive, as indicated by C in the various Figures.

It should be noted that wall 60 is slightly displaced and away from wall 59 with respect to the position taken up by the active position of belt 12 relative to wall 9. This permits space for a set of fingers 62 intended for pushing the core from position A5 up to the position where the winding begins. The fingers 62 have the form for blades and may also be partially disposed in slots formed in the wall 60. Fingers 62 are relatively thin at their ends in order to reduce as far as possible the interference surface made up of said ends with respect to the strip of adhesive C that might rub on fingers 62 at the rotation start of core 5 inserted for the winding.

When in position A5, the core is pushed at the precise moment by fingers 62 into the interspace between two cylinders 64 and 66 making part of the group for the winding of paper web N on the cores. Web N comes from the reel of two-fold web or from one or two reels of web coming from the paper mill, and is diverted by suitable pulleys and fed to cylinder 66 which rotates according to the arrow indicated on roll 66 in FIG. 6. On cylinder 66, the web is perforated and then moved towards the groove between the same cylinder 66 and cylinder 64 where the core is inserted from position A5 so as to cause the winding of the web on the core in order to form a log or roll indicated by BS in FIG. 6. The log or roll BS is formed resting on cylinders 66 and 64 and with a progressive removal therefrom, the winding being controlled by a presser roller 68. Upon completion of the winding for the formation of a log or roll BS, the roll moves away and a new core is inserted from position A5 into the interspace between the two cylinders 64 and 66 for the restart of a new winding.

It should be noted that the core A5, inserted by means of the fingers 62 into the interspace between said cylinders 64 and 66, is initially made to roll on wall 59, thus reaching the zone of minimum distance between the two cylinders 64 and 66 when the zone of adhesive C comes into contact with paper web N and moves forward together with roller 66 and onto roller 64. Accordingly, the strip of adhesive is made to act on the paper web which must be retained on the core by said adhesive for starting the winding of the web thereon. Therefore, the adhesive does not come into contact with any of the rewinder members except, and only to a limited extent, with the ends of fingers 62 which are of limited dimension and, moreover, are in any case continuously cleaned by the subsequent cores being pushed into the winding zone, and thus without any risk of accumulation of adhesive on the ends of fingers 62.

After each insertion of a core from position A5 into the interspace between cylinder 64, 66, fingers 62 return between walls 59 and 60, and a new core can be pushed from the position A4 by belt 12 to reach the position A5. The time for this transfer is practically the time for the formation of a roll or log BS, and thus is a time sufficient for performing all the operations with sufficiently limited velocity, acceleration and deceleration in order to achieve the feeding of longitudinally glued cores with absolute regularity for the rewinder operation.

It is furthermore to be understood that the present invention may be embodied in other specific forms without departing from the spirit or special attributes; and it is, therefore, desired that the present embodiments be considered in all respects as illustrative and, therefore, not restrictive, reference being made to the appended claims rather than to the foregoing description to indicate the scope of the invention.

Having thus described the invention, what is claimed as new and desired to protect by Letters Patent are the following:

1. [In an] *An* apparatus for convolutely winding [of] webs of sheet material onto a small diameter core, *comprising* means for feeding said core in an axial movement toward the apparatus[,];

means for feeding said sheet material toward said core orthogonally to the direction of *axial* movement of said core *comprising a first winding cylinder and a second winding cylinder positioned in relation to each other so as to have an interspace present therebetween through which said sheet material is fed;* a core-receiving seat in said apparatus[,] *positioned adjacent said interspace between said first winding cylinder and said second winding cylinder on a side from which said sheet material is fed;* means for *axially* moving said core *from a side of said apparatus* into said core-receiving seat of the apparatus[,];

*means for pushing a core perpendicularly to said core's axis from said core-receiving seat into the interspace present between said first winding cylinder and said second winding cylinder, said core crossing said interspace;* and adhesive-applying means disposed along the axial path of the core and arranged to apply a single longitudinal strip of adhesive to said core *during axial movement of said core toward said apparatus but* prior to its insertion into said core-receiving seat.

2. The apparatus of claim 1, including a pair of spaced-apart supports for said core in the adhesive-applying area with the adhesive-applying means disposed between the pair of supports.

3. The apparatus of claim 2 wherein one of said pair of supports is a continuous moving belt.

4. The apparatus of claim 3 including a pressure-applying belt arranged in the adhesive-applying section in opposition to the said continuously-moving belt.

5. The apparatus of claim 1 wherein the adhesive-applying means includes a rotating disc and an adhesive container, wherein said rotating disc is arranged to enter the adhesive container and remove adhesive therefrom and pass it in a grazing manner to the core passing through the adhesive-applying zone.

6. The apparatus of claim 5 wherein the peripheral speed of the rotating disc is less than the speed of the core moving through the adhesive-applying zone.

* * * * *